United States Patent
Watanabe

(10) Patent No.: US 11,111,182 B2
(45) Date of Patent: Sep. 7, 2021

(54) CERAMIC SINTERED BODY

(71) Applicant: TUNGALOY CORPORATION, Fukushima (JP)

(72) Inventor: Takashi Watanabe, Iwaki (JP)

(73) Assignee: TUNGALOY CORPORATION, Iwaki (JP)

( * ) Notice: Subject to any disclaimer, the term of this patent is extended or adjusted under 35 U.S.C. 154(b) by 617 days.

(21) Appl. No.: 16/060,367

(22) PCT Filed: Nov. 25, 2016

(86) PCT No.: PCT/JP2016/085055
§ 371 (c)(1),
(2) Date: Jun. 7, 2018

(87) PCT Pub. No.: WO2017/098937
PCT Pub. Date: Jun. 15, 2017

(65) Prior Publication Data
US 2018/0362409 A1    Dec. 20, 2018

(30) Foreign Application Priority Data
Dec. 7, 2015 (JP) .............................. JP2015-238155

(51) Int. Cl.
*C04B 35/111* (2006.01)
*B23B 27/14* (2006.01)
(Continued)

(52) U.S. Cl.
CPC .......... *C04B 35/1115* (2013.01); *B23B 27/14* (2013.01); *C04B 35/119* (2013.01);
(Continued)

(58) Field of Classification Search
CPC ..... B23B 27/14; C04B 35/48; C04B 35/4885; C04B 35/5626; C04B 35/6261;
(Continued)

(56) References Cited

U.S. PATENT DOCUMENTS 5,017,524 A    5/1991  Moskowitz et al.
5,536,485 A *  7/1996  Kume ...................... B01J 3/062
                                                    419/11
(Continued)

FOREIGN PATENT DOCUMENTS

JP    H03-294101 A    12/1991
JP    H08-277159 A    10/1996
(Continued)

OTHER PUBLICATIONS

International Search Report issued in PCT/JP2016/085055; dated Dec. 20, 2016.
(Continued)

*Primary Examiner* — Pegah Parvini
*Assistant Examiner* — Ross J Christie
(74) *Attorney, Agent, or Firm* — Studebaker & Brackett PC

(57) ABSTRACT

A ceramic sintered body containing aluminum oxide, tungsten carbide and zirconium oxide, wherein: the zirconium oxide contains ZrO and $ZrO_2$; the $ZrO_2$ has a crystal structure or structures of one or two kinds selected from the group consisting of a tetragonal crystal structure and a cubic crystal structure; and when, in X-ray diffraction, regarding a peak intensity for a (111) plane of the ZrO as being denoted by $I_1$, regarding a peak intensity for a (101) plane of $ZrO_2$ having a tetragonal crystal structure as being denoted by $I_{2t}$, and also regarding a peak intensity for a (111) plane of $ZrO_2$ having a cubic crystal structure as being denoted by $I_{2c}$, a ratio of $I_1$ based on a total of $I_1$, $I_{2t}$ and $I_{2c}$ [$I_1/(I_1+I_{2t}+I_{2c})$] is from 0.05 or more to 0.90 or less.

12 Claims, 1 Drawing Sheet

(51) Int. Cl.
*C04B 35/626* (2006.01)
*C04B 35/488* (2006.01)
*C04B 35/645* (2006.01)
*C04B 35/119* (2006.01)
*C04B 35/48* (2006.01)
*C04B 35/56* (2006.01)

(52) U.S. Cl.
CPC .......... *C04B 35/48* (2013.01); *C04B 35/4885* (2013.01); *C04B 35/5626* (2013.01); *C04B 35/6261* (2013.01); *C04B 35/62625* (2013.01); *C04B 35/6455* (2013.01); *C04B 2235/3217* (2013.01); *C04B 2235/3225* (2013.01); *C04B 2235/3244* (2013.01); *C04B 2235/3246* (2013.01); *C04B 2235/3847* (2013.01); *C04B 2235/5436* (2013.01); *C04B 2235/5445* (2013.01); *C04B 2235/5454* (2013.01); *C04B 2235/604* (2013.01); *C04B 2235/658* (2013.01); *C04B 2235/6567* (2013.01); *C04B 2235/661* (2013.01); *C04B 2235/762* (2013.01); *C04B 2235/765* (2013.01); *C04B 2235/785* (2013.01); *C04B 2235/786* (2013.01); *C04B 2235/80* (2013.01)

(58) Field of Classification Search
CPC .......... C04B 35/62625; C04B 35/6455; C04B 2235/3217; C04B 2235/3225; C04B 2235/3244; C04B 2235/3246; C04B 2235/3847; C04B 2235/5436; C04B 2235/5445; C04B 2235/5454; C04B 2235/604; C04B 2235/6567; C04B 2235/658; C04B 2235/661; C04B 2235/762; C04B 2235/765; C04B 2235/785; C04B 2235/786; C04B 2235/80

See application file for complete search history.

(56) References Cited

U.S. PATENT DOCUMENTS

| | | | |
|---|---|---|---|
| 5,665,127 | A | 9/1997 | Moltgen et al. |
| 8,927,447 | B2 * | 1/2015 | Moteki ................. C04B 35/119 |
| | | | 501/105 |
| 9,181,135 | B2 * | 11/2015 | Malik ................. C04B 35/5611 |
| 2007/0132154 | A1 * | 6/2007 | Hulbert ............. C04B 35/62615 |
| | | | 264/434 |
| 2013/0236259 | A1 | 9/2013 | Moteki et al. |
| 2014/0242383 | A1 | 8/2014 | Moteki et al. |

FOREIGN PATENT DOCUMENTS

| | | |
|---|---|---|
| JP | H11-217258 A | 8/1999 |
| JP | 5174291 B1 | 4/2013 |
| JP | 5519875 B1 | 6/2014 |

OTHER PUBLICATIONS

International Preliminary Report on Patentability and Written Opinion issued in PCT/JP2016/085055; dated Jun. 12, 2018.

* cited by examiner

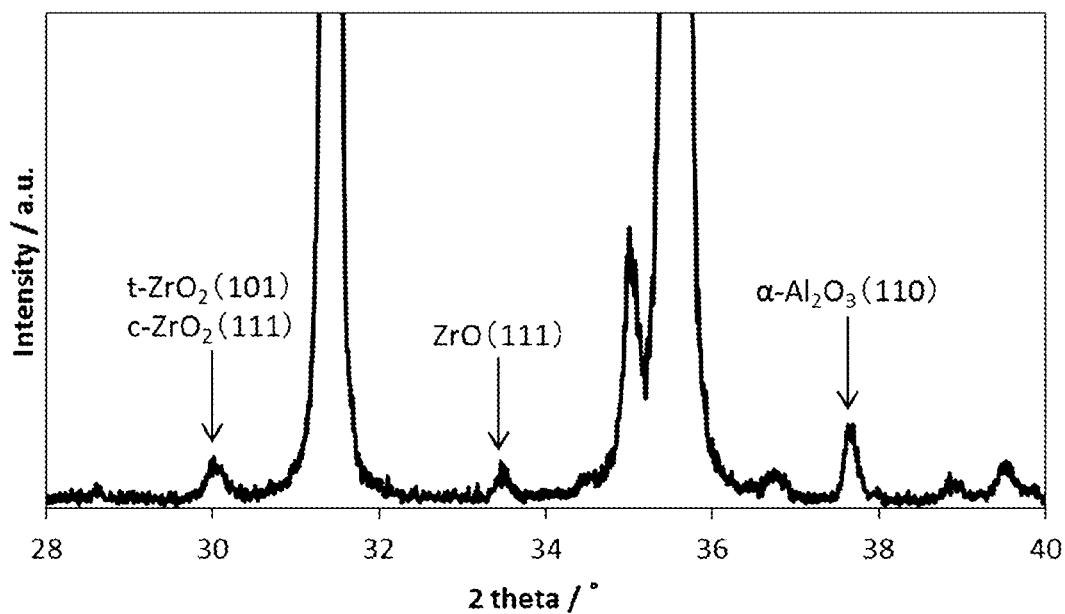

CERAMIC SINTERED BODY

TECHNICAL FIELD

The present invention relates to a ceramic sintered body.

BACKGROUND ART

Aluminum oxide-zirconium oxide ceramics are generally materials having excellent chemical stability and wear resistance and are used as various structural members and cutting tool materials. The performance of aluminum oxide-zirconium oxide ceramics greatly depend on the crystalline phase, the particle size and the aggregation and dispersion states of zirconium oxide, and such performance has therefore been discussed in various ways from the viewpoints set forth above (see, for example, Patent Document 1).

CITATION LIST

Patent Documents

Patent Document 1: JP5174291 B

SUMMARY

Technical Problem

Heat-resistant alloys, typified by a nickel-based heat-resistant alloy, have high tensile strength at high temperature and corrosion resistance and are therefore used as materials for components for jet engines and gas turbines, by way of example. In the cutting of such heat-resistant alloys, the heat-resistant alloys have, in addition to the above material characteristics, low thermal conductivity and high chemical reactivity to cutting tools, and are therefore known to cause significantly short tool lives.

High-speed cutting of a nickel-based heat-resistant alloy often employs aluminum oxide-zirconium oxide ceramics as cutting tool materials. Thus, such aluminum oxide-zirconium oxide ceramics are required to have wear resistance and fracture resistance which can withstand the above usage. For instance, the aluminum oxide-zirconium oxide ceramic sintered body disclosed in Patent Document 1 is intended to achieve an improvement of wear resistance or fracture resistance by way of performing control over the structure thereof. However, the ceramic sintered body disclosed in Patent Document 1 does not have sufficient wear resistance and has a short tool life, and has therefore suffered from a problem in that it is difficult to achieve a long machining time.

The present invention has been made in order to solve the above problem, and an object of the present invention is to provide a ceramic sintered body which, when being used as a material for a tool, such as a cutting tool or a wear resistant tool, achieves suppression of a reduction in fracture resistance and also achieves an improvement of wear resistance, and which accordingly leads to a long tool life of the tool.

Solution to Problem

The present inventor has conducted studies regarding a ceramic sintered body and have then obtained findings to the effect that, particularly in high-speed machining and highly efficient machining of a nickel-based heat resistant alloy with the use of a tool made of the above ceramic sintered body, the following configurations of such ceramic sintered body achieve suppression of a reduction in fracture resistance and also achieve an improvement of wear resistance. As a result, the present inventor has found that an extended tool life can be achieved with a tool made of the ceramic sintered body, and this had led to the completion the present invention.

The gist of the present invention is as set forth below.

(1) A ceramic sintered body containing aluminum oxide, tungsten carbide and zirconium oxide, wherein:
the zirconium oxide contains ZrO and $ZrO_2$;
the $ZrO_2$ has a crystal structure or structures of one or two kinds selected from the group consisting of a tetragonal crystal structure and a cubic crystal structure; and when, in X-ray diffraction, regarding a peak intensity for a (111) plane of the ZrO as being denoted by $I_1$, regarding a peak intensity for a (101) plane of $ZrO_2$ having a tetragonal crystal structure as being denoted by $I_{2t}$, and also regarding a peak intensity for a (111) plane of $ZrO_2$ having a cubic crystal structure as being denoted by $I_{2c}$, a ratio of $I_1$ based on a total of $I_1$, $I_{2t}$ and $I_{2c}$ [$I_1/(I_1+I_{2t}+I_{2c})$] is from 0.05 or more to 0.90 or less.

(2) The ceramic sintered body according to (1), wherein the ratio of $I_1$ based on a total of $I_1$, $I_{2t}$ and $I_{2c}$ [$I_1/(I_1+I_{2t}+I_{2c})$] is from 0.20 or more to 0.80 or less.

(3) The ceramic sintered body according to (1) or (2), wherein:
the aluminum oxide is α-type aluminum oxide; and
when, in X-ray diffraction, regarding a peak intensity for a (110) plane of the α-type aluminum oxide as being denoted by $I_3$, a ratio of a total of $I_{2t}$ and $I_{2c}$ based on $I_3$ [$(I_{2t}+I_{2c})/I_3$] is from 0.30 or more to 4.00 or less.

(4) The ceramic sintered body according to any of (1) to (3), wherein, based on a total content of the ceramic sintered body:
a content of the aluminum oxide is from 30 volume % or more to 74 volume % or less;
a content of the tungsten carbide is from 25 volume % or more to 69 volume % or less; and
a content of the zirconium oxide is from 1 volume % or more to 20 volume % or less.

(5) The ceramic sintered body according to any of (1) to (4), wherein an average particle size of the aluminum oxide is from 0.20 μm or more to 2.00 μm or less.

(6) The ceramic sintered body according to any of (1) to (5), wherein an average particle size of the tungsten carbide is from 0.10 μm or more to 1.50 μm or less.

Advantageous Effects of Invention

The present invention can provide a ceramic sintered body which, when being used as a material for a tool, such as a cutting tool or a wear resistant tool, achieves suppression of a reduction in fracture resistance and also achieves an improvement of wear resistance, and which accordingly leads to a long tool life of the tool.

BRIEF DESCRIPTION OF DRAWINGS

FIG. 1 is a chart showing an X-ray diffraction measurement pattern of a ceramic sintered body according to an embodiment of the present invention.

DESCRIPTION OF EMBODIMENTS

An embodiment for carrying out the present invention (hereinafter simply referred to as the "present embodiment") will hereinafter be described in detail, with reference to the attached drawings as appropriate. However, the present invention is not limited to the present embodiment below, and various modifications may be made to the present invention without departing from the gist of the invention. It should be noted that, in the drawings, the same elements are denoted by the same symbols and will not be further explained. Unless otherwise specified, positional relationships, such as vertical and horizontal relationships, are based on the positional relationships shown in the drawings. Further, the dimensional ratios of the drawings are not limited to those shown therein.

A ceramic sintered body according to the present embodiment contains aluminum oxide, tungsten carbide and zirconium oxide. More specifically, the ceramic sintered body according to the present embodiment preferably contains aluminum oxide-zirconium oxide ceramics and tungsten carbide. This leads to a further improvement of wear resistance.

If the content of the aluminum oxide contained in the ceramic sintered body of the present embodiment is 30 volume % or more based on the total content (100 volume %) of the ceramic sintered body, this indicates the tendency of the effect of suppressing reaction wear to be further enhanced, and, if such content of aluminum oxide is 74 volume % or less, this indicates the tendency of the wear resistance to be further improved. Further, if the content of the tungsten carbide contained in the ceramic sintered body is 25 volume % or more and is more preferably 30 volume % or more based on the total content (100 volume %) of the ceramic sintered body, this indicates the tendency of the wear resistance to be further improved, and, if such content of tungsten carbide is 69 volume % or less, this indicates the tendency of the effect of suppressing reaction wear to be further enhanced. Moreover, if the content of the zirconium oxide contained in the ceramic sintered body is 1 volume % or more based on the total content (100 volume %) of the ceramic sintered body, this indicates the tendency of the toughness of the ceramic sintered body to be further enhanced, and this may lead to a further improvement of fracture resistance, and, if such content of zirconium oxide is 20 volume % or less, this indicates the tendency of the strength thereof to be further enhanced, and this may lead to a further improvement of fracture resistance.

Therefore, in the ceramic sintered body of the present embodiment, it is preferable that, based on the total content thereof: the content of the aluminum oxide is from 30 volume % or more to 74 volume % or less; the content of the tungsten carbide is from 25 volume % or more to 69 volume % or less; and the content of the zirconium oxide is from 1 volume % or more to 20 volume % or less. It should be noted that the content of the tungsten carbide is more preferably from 30 volume % or more to 69 volume % or less.

The zirconium oxide according to the present embodiment contains ZrO and $ZrO_2$. If the zirconium oxide contains ZrO, this leads to an improvement in the wear resistance of the ceramic sintered body. If the zirconium oxide contains $ZrO_2$, this can provide the effect of improving the toughness of the ceramic sintered body due to the stress-induced transformation thereof. Such improvement in the toughness of the ceramic sintered body results in an improvement of the fracture resistance thereof. Further, the $ZrO_2$ contained in the ceramic sintered body of the present embodiment preferably comprises either one or both of a tetragonal crystal system and a cubic crystal system. That is, the $ZrO_2$ preferably has a crystal structure or structures of one or two kinds selected from the group consisting of a tetragonal crystal system and a cubic crystal system. This leads to an improvement in the toughness of the ceramic sintered body, thereby allowing for an improvement in the fracture resistance thereof. It should be noted that, the $ZrO_2$ contained in the ceramic sintered body of the present embodiment is preferably $ZrO_2$ which is obtained through the addition of one or more kinds selected from the group consisting of $CeO_2$, $Y_2O_3$, MgO and CaO from the perspectives of stabilizing the crystal structure and enhancing the effect derived from stress-induced transformation. If the crystal structure of $ZrO_2$ comprises either or both of a cubic crystal structure and a tetragonal crystal structure or comprises both of the crystal structures, the effect of improving the toughness of the ceramic sintered body can be exerted to the maximum. It should be noted that, in this specification, the term "$ZrO_2$" refers to $ZrO_2$ with any of the following crystal systems, i.e., $ZrO_2$ having a tetragonal crystal structure (hereinafter referred to as "tetragonal $ZrO_2$"); $ZrO_2$ having a monoclinic crystal structure (hereinafter referred to as "monoclinic $ZrO_2$"); and $ZrO_2$ having a cubic crystal structure (hereinafter referred to as "cubic $ZrO_2$"). In other words, in this specification, $ZrO_2$ refers to one or more kinds selected from the group consisting of tetragonal $ZrO_2$, monoclinic $ZrO_2$ and cubic $ZrO_2$. Therefore, even when containing monoclinic $ZrO_2$, the ceramic sintered body of the present embodiment can exert the effect derived from containing $ZrO_2$.

When regarding a peak intensity for a (111) plane of ZrO as being denoted by $I_1$, regarding a peak intensity for a (101) plane of tetragonal $ZrO_2$ as being denoted by $I_{2t}$, and also regarding a peak intensity for a (111) plane of cubic $ZrO_2$ as being denoted by $I_{2c}$, a ratio of $I_1$ based on a total of $I_1$, $I_{2t}$ and $I_{2c}$ [$I_1/(I_1+I_{2t}+I_{2c})$] is from 0.05 or more to 0.90 or less. If the ratio of $I_1$ based on a total of $I_1$, $I_{2t}$ and $I_{2c}$ [$I_1/(I_1+I_{2t}+I_{2c})$] is 0.05 or more, the effect derived from containing ZrO can be obtained more reliably and effectively, thereby leading to an improvement in the wear resistance of the ceramic sintered body. Meanwhile, if the ratio of $I_1$ based on a total of $I_1$, $I_{2t}$ and $I_{2c}$ [$I_1/(I_1+I_{2t}+I_{2c})$] is 0.90 or less, this provides the effect of improving the toughness of the ceramic sintered body due to an increased content of $ZrO_2$, thereby leading to an improvement in the fracture resistance of the ceramic sintered body. In particular, the ratio of $I_1$ based on a total of $I_1$, $I_{2t}$ and $I_{2c}$ [$I_1/(I_1+I_{2t}+I_{2c})$] is preferably from 0.20 or more to 0.80 or less.

Herein, a total of the peak intensity $I_1$ for the (111) plane of ZrO, the peak intensity $I_{2t}$ for the (101) plane of tetragonal $ZrO_2$ and the peak intensity $I_{2c}$ for the (111) plane of cubic $ZrO_2$, corresponds to the value obtained by adding the peak intensity $I_1$ for the (111) plane of ZrO, the peak intensity $I_{2t}$ for the (101) plane of tetragonal $ZrO_2$, and the peak intensity $I_{2c}$ for the (111) plane of cubic $ZrO_2$. For example, JCPDS Card No. 51-1149 shows that a diffraction peak of 2θ for the (111) plane of ZrO exists at around 33.5°. Further, JCPDS Card No. 72-2743 shows that a diffraction peak of 2θ for the (101) plane of tetragonal $ZrO_2$ exists at around 30.18°, and JCPDS Card No. 49-1642 shows that a diffraction peak of 2θ for the (111) plane of cubic $ZrO_2$ exists at around 30.12°. Accordingly, when performing an X-ray diffraction measurement on the ceramic sintered body, the ratio of h based on a total of $I_1$, $I_{2t}$ and $I_{2c}$ [$I_1/(I_1+I_{2t}+I_{2c})$] can be calculated based on the peak intensities of the above diffraction peaks of 2θ.

With regard to the aluminum oxide in the present embodiment, the crystal system thereof is α type. In other words, α-type aluminum oxide is preferred because reaction wear can be further suppressed, particularly in the machining of a nickel-based heat resistant alloy. Further, when regarding a peak intensity for a (110) plane of α-type aluminum oxide in X-ray diffraction as being denoted by $I_3$, a ratio of a total of $I_{2t}$ and $I_{2c}$ based on $I_3$ $[(I_{2t}+I_{2c})/I_3]$ is preferably from 0.30 or more to 4.00 or less. If $(I_{2t}+I_{2c})/I_3$ is 0.30 or more, this leads to a further improvement of toughness due to an increased content of tetragonal $ZrO_2$ and cubic $ZrO_2$, thereby resulting in the tendency of the fracture resistance to be improved. If $(I_{2t}+I_{2c})/I_3$ is 4.00 or less, this leads to a high thermal conductivity due to a relatively increased content of α-type aluminum oxide, thereby resulting in the tendency of fracturing due to reaction wear being less likely to occur. It should be noted that a total of the peak intensity $I_{2t}$ for the (101) plane of tetragonal $ZrO_2$ and the peak intensity $I_{2c}$ for the (111) plane of cubic $ZrO_2$ corresponds to the value obtained by adding the peak intensity $I_{2t}$ for the (101) plane of tetragonal $ZrO_2$ and the peak intensity $I_{2c}$ for the (111) plane of cubic $ZrO_2$.

With regard to the (110) plane of α-type aluminum oxide, JCPDS Card No. 83-2080 shows that a diffraction peak of 2θ therefor exists at around 37.76°.

The peak intensities, in X-ray diffraction, of the ZrO, tetragonal $ZrO_2$, cubic $ZrO_2$ and α-type aluminum oxide in the present embodiment can be measured using a commercially available X-ray diffractometer. For instance, when performing an X-ray diffraction measurement, with an X-ray diffractometer (product name "RINT TTR III") manufactured by Rigaku Corporation, by means of a 2θ/θ focusing optical system with Cu-Kα radiation under the following conditions, the X-ray diffraction intensities (peak intensities) can be measured with regard to the diffraction lines of the (111) plane of ZrO, the (101) plane of tetragonal $ZrO_2$, the (111) plane of cubic $ZrO_2$ and the (110) plane of α-type aluminum oxide. Herein, the measurement conditions are as set forth below: an output: 50 kV, 250 mA; an incident-side solar slit: 5°; a divergence longitudinal slit: ⅔°; a divergence longitudinal limit slit: 5 mm; a scattering slit: ⅔°; a light-receiving side solar slit: 5°; a light-receiving slit: 0.3 mm; a BENT monochromater; a light-receiving monochrome slit: 0.8 mm; a sampling width: 0.01°; a scan speed: 2°/min; and a 2θ measurement range: 20°-80°. When obtaining the above peak intensities from the obtained X-ray diffraction pattern, analysis software included with the X-ray diffractometer may be used. With such analysis software, background removal is conducted using cubic spline, and profile fitting is conducted using Pearson-VII function, whereby the peak intensities can be obtained.

The average particle size of the aluminum oxide according to the present embodiment is preferably from 0.20 μm or more to 2.00 μm or less because this leads to an improvement in the toughness of the ceramic sintered body, thereby resulting in excellent fracture resistance. If the average particle size of the aluminum oxide is 0.20 μm or more, this can further prevent the falling of Al compound particles, thereby leading to a further improvement of wear resistance. Meanwhile, if the average particle size of the aluminum oxide is 2.00 μm or less, this can achieve a further enhancement in the toughness of the ceramic sintered body, thereby leading to a further improvement of fracture resistance.

The average particle size of the tungsten carbide according to the present embodiment is preferably from 0.10 μm or more to 1.50 μm or less because this leads to improvements of fracture resistance and wear resistance. If such average particle size is 0.10 μm or more, this can further prevent non-uniformity in the structure of the sintered body, which derives from the aggregation of the tungsten carbide, thereby leading to a further improvement of fracture resistance. If the average particle size of the tungsten carbide is 1.50 μm or less, this can achieve a further improvement of wear resistance. From the same perspective, the average particle size of the tungsten carbide is more preferably from 0.30 μm or more to 1.50 μm or less.

The contents of the aluminum oxide, the tungsten carbide and the zirconium oxide in the ceramic sintered body of the present embodiment can be obtained by analyzing a structural photograph of the ceramic sintered body which has been taken by a scanning electron microscope (SEM), using commercially available image analysis software. More specifically, firstly, the surface of the ceramic sintered body or any cross-sectional surface thereof is mirror-polished, and then, using the SEM, an observation is conducted on a backscattered electron image of the mirror-polished surface of the ceramic sintered body. At this time, the polished surface of the ceramic sintered body, which has been magnified from 5,000 times or more to 10,000 times or less using the SEM, is observed via a backscattered electron image. Using an energy-dispersive X-ray spectroscope (EDS) included with the SEM, it can be determined that: a black region refers to aluminum oxide; a gray region refers to zirconium oxide; and a white region refers to tungsten carbide. Thereafter, a structural photograph is taken of the polished surface of the ceramic sintered body, using the SEM. With commercially available image analysis software, the respective occupied areas of the aluminum oxide, the tungsten carbide and the zirconium oxide are obtained from the obtained structural photograph, and the volume contents (volume %) are obtained from the resultant ratios. The composition can be identified using an X-ray diffractometer.

The average particle size of the tungsten carbide according to the present embodiment can be obtained by analyzing a structural photograph of the ceramic sintered body which has been taken by the SEM, in accordance with ASTM E 112-96, using commercially available image analysis software. More specifically, the surface of the ceramic sintered body or any cross-sectional surface thereof is mirror-polished, and then, using the SEM, an observation is conducted on a backscattered electron image of the mirror-polished surface of the ceramic sintered body. At this time, a structural photograph of the polished surface of the ceramic sintered body, which has been magnified from 5,000 times or more to 20,000 times or less is taken, using the SEM. With commercially available image analysis software, the diameter of a circle which is equal in area to the tungsten carbide included in the obtained structural photograph is defined as a particle size of the tungsten carbide, and the average value is obtained from the particle sizes of the tungsten carbide located in the cross-sectional structure.

The average particle size of the aluminum oxide according to the present embodiment can be obtained by analyzing a structural photograph of the ceramic sintered body which has been taken by the SEM, using commercially available image analysis software. The average particle size of the aluminum oxide according to the present embodiment is obtained by performing a measurement, concerning the aluminum oxide, on a structure of the ceramic sintered body which has undergone thermal etching. When thermal etching is performed at a temperature lower than the sintering temperature, the average particle size of the aluminum oxide can be obtained. More specifically, the surface of the ceramic sintered body or any cross-sectional surface thereof is mirror-polished, and, using a vacuum sintering furnace, thermal etching is performed on the ceramic sintered body which has undergone mirror polishing under the conditions of: a pressure of from $3.0 \times 10^{-3}$ Pa or higher to $6.3 \times 10^{-3}$ Pa or lower; a temperature of from 1,000° C. or higher to 1,250°

C. or lower; and a holding time of from 30 minutes or more to 60 minutes or less. A secondary electron image of the polished surface of the thermally-etched ceramic sintered body is observed using the SEM. At this time, a structural photograph of the polished surface of the ceramic sintered body, which has been magnified from 5,000 times or more to 20,000 times or less, is taken, using the SEM. With commercially available image analysis software, the diameter of a circle which is equal in area to the aluminum oxide included in the obtained structural photograph is defined as a particle size of the aluminum oxide, and the average value is obtained from the particle sizes of the aluminum oxide located in the cross-sectional structure. At this time, in terms of the details, the average particle size of the aluminum oxide can be obtained by making analysis in accordance with ASTM E 112-96.

Herein, the polished surface of the ceramic sintered body is a surface of the ceramic sintered body which is exposed by mirror-polishing the surface of the ceramic sintered body or any cross-sectional surface thereof. Examples of a method of obtaining a polished surface of a ceramic sintered body include a polishing method with the use of diamond paste.

For instance, a method of manufacturing a ceramic sintered body according to the present embodiment includes steps (A) to (E) set forth below:

step (A): a step of formulating: 29 volume % or more to 73 volume % or less of an aluminum oxide powder with an average particle size of from 0.2 μm or more to 2.0 μm or less; 25 volume % or more to 69 volume % or less of a tungsten carbide powder with an average particle size of from 0.05 μm or more to 3.0 μm or less; 1 volume % or more to 20 volume % or less of a $ZrO_2$ powder with an average particle size of from 0.2 μm or more to 2.0 μm or less; and 1 volume % or more to 5 volume % or less of an Al powder with an average particle size of from 0.5 μm or more to 5.0 μm or less (the total should be 100 volume %), and thereby obtaining raw material powders;

step (B): a step of mixing, with cemented carbide balls, the raw material powders formulated in step (A), by means of a wet ball mill for 5 hours to 24 hours, and thereby preparing a mixture;

step (C): a molding step of molding the mixture obtained in step (B) into a predetermined shape and thereby obtaining a molded body;

step (D): a step of receiving the molded body obtained in step (C) in a sintering furnace, holding and sintering such molded body in an argon gas at a sintering temperature of from 1,600° C. or higher to 1,800° C. or lower for a predetermined period, and thereby obtaining a pre-HIP sintered body; and step (E): a step of holding the pre-HIP sintered body obtained in step (D) and performing an HIP process on such pre-HIP sintered body in an argon gas at a pressure of from 100 MPa or higher to 150 MPa or lower, at a temperature of from 1,500° C. or higher to 1,700° C. or lower for a predetermined period, and thereby obtaining a sintered body.

The steps in the above method of manufacturing a ceramic sintered body according to the present embodiment have the respective meanings set forth below.

In step (A), the composition of a ceramic sintered body can be adjusted. Further, the particle sizes of aluminum oxide and tungsten carbide can also be adjusted. It should be noted that, with the use of a $ZrO_2$ powder obtained through the addition of $CeO_2$, $Y_2O_3$, MgO, CaO or the like, tetragonal or cubic $ZrO_2$ having more excellent toughness can be formed. If the average particle size of primary particles of the $ZrO_2$ powder is from 30 nm or more to 50 nm or less, this provides the effect of minute $ZrO_2$ being prone to being dispersed in the structure of the ceramic sintered body. However, in terms of ease of handling, it is preferable to employ a $ZrO_2$ powder consisting of secondary particles with an average particle size of from 0.1 μm or more to 2 μm or less in which primary particles of $ZrO_2$ with an average particle size of from 30 nm or more to 50 nm or less have aggregated.

In step (B), raw material powders for a predetermined formulation composition can be mixed uniformly.

In step (C), the mixture obtained in step (B) is molded into a predetermined shape. The obtained molded body is sintered in step (D) (sintering step) below.

In step (D), the molded body is sintered, thereby making it possible to manufacture the ceramic sintered body. The particle sizes of aluminum oxide and tungsten carbide can be controlled by adjusting the sintering temperature. Accordingly, it is preferable to combine the particle sizes of the powders formulated in step (A) and the sintering temperature in step (D) because this allows control to be easily performed over the particle sizes of aluminum oxide and tungsten carbide.

Further, a composite body containing ZrO can be produced by sintering $ZrO_2$ and an Al powder at a high temperature. This can be considered to derive from the point that ZrO is formed due to the progress of the reaction represented by formula (1) below. In view of this, in step (A), the ratio of ZrO formed can be controlled by adjusting the ratios of the $ZrO_2$ powder and the Al powder.

$$3ZrO_2 + 2Al \rightarrow 3ZrO + Al_2O_3 \quad (1)$$

Utilizing the above reaction, the ratios of the respective intensities in X-ray diffraction intensities can be controlled so as to have desired values.

In step (E), pores in the sintered body can be reduced by performing an HIP process on the sintered body, and this leads to an improvement of fracture resistance. When an HIP process is not performed on a ceramic sintered body which has involved the formation of ZrO, a large number of pores are dispersed in such ceramic sintered body, and thus, this causes low fracture resistance compared with the case of performing an HIP process on the ceramic sintered body.

A grinding process or an edge honing process may be performed, as necessary, on the ceramic sintered body obtained through steps (A) to (E).

The ceramic sintered body of the present embodiment has excellent wear resistance and fracture resistance, and thus, such ceramic sintered body is preferably applied to cutting tools and wear resistant tools and is further preferably applied, in particular, to cutting tools.

EXAMPLES

Formulation was performed with regard to the formulation compositions shown in Table 1, using: an aluminum oxide ($Al_2O_3$) powder with an average particle size of 0.2 μm, 0.4 μm, 0.6 μm, 0.8 μm, 1.0 μm or 2.0 μm; a tungsten carbide (WC) powder with an average particle size of 0.3 μm, 0.5 μm, 0.7 μm, 1.0 μm, 1.2 μm or 1.5 μm; a $ZrO_2$ (PSZ) powder of secondary particles with an average particle size of 0.6 μm, in which primary particles of $ZrO_2$ with an average particle size of 40 nm had aggregated, such $ZrO_2$ (PSZ) powder being obtained through the addition of 3 mol % of $Y_2O_3$ based on $ZrO_2$ in its entirety; and an Al powder with an average particle size of 3.0 μm.

TABLE 1

| Sample No. | Formulation composition (volume %) |
|---|---|
| Invention sample 1 | 26% Al$_2$O$_3$, 60% WC, 10% PSZ, 4% Al |
| Invention sample 2 | 44% Al$_2$O$_3$, 34% WC, 20% PSZ, 2% Al |
| Invention sample 3 | 67% Al$_2$O$_3$, 27% WC, 1% PSZ, 5% Al |
| Invention sample 4 | 29% Al$_2$O$_3$, 65% WC, 3% PSZ, 3% Al |
| Invention sample 5 | 42.5% Al$_2$O$_3$, 45% WC, 12% PSZ, 0.5% Al |
| Invention sample 6 | 42% Al$_2$O$_3$, 45% WC, 9% PSZ, 4% Al |
| Invention sample 7 | 40% Al$_2$O$_3$, 41% WC, 11% PSZ, 8% Al |
| Invention sample 8 | 57% Al$_2$O$_3$, 30% WC, 9% PSZ, 4% Al |
| Invention sample 9 | 54% Al$_2$O$_3$, 31% WC, 14% PSZ, 1% Al |
| Invention sample 10 | 56% Al$_2$O$_3$, 40% WC, 3% PSZ, 1% Al |
| Invention sample 11 | 46% Al$_2$O$_3$, 43% WC, 7% PSZ, 4% Al |
| Invention sample 12 | 35% Al$_2$O$_3$, 45% WC, 17% PSZ, 3% Al |
| Comparative sample 1 | 83% Al$_2$O$_3$, 15% PSZ, 2% Al |
| Comparative sample 2 | 60% Al$_2$O$_3$, 40% WC |
| Comparative sample 3 | 46% Al$_2$O$_3$, 45% WC, 9% PSZ |
| Comparative sample 4 | 34% Al$_2$O$_3$, 61 %WC, 5% PSZ |
| Comparative sample 5 | 45% Al$_2$O$_3$, 43% WC, 2% PSZ, 10% Al |
| Comparative sample 6 | 95% WC, 5% PSZ |

The formulated raw material powders were received, in a ball mill cylinder, together with cemented carbide balls and an acetone solvent and were mixed by means of a wet ball mill. The mixture obtained by such mixing with the ball mill was molded via powder compression so as to obtain a molded body. The obtained molded body was received in a sintering furnace and then kept and sintered in an argon gas for 2 hours at the sintering temperature shown in Table 2. Thereafter, the temperature of the sintering furnace was set at 1,500° C., and an HIP process was performed on the sintered body at the HIP pressure shown in Table 2 in an argon gas. As a result, the ceramic bodies of the invention samples and comparative samples were obtained.

TABLE 2

| Sample No. | Sintering temperature (° C.) | HIP pressure (MPa) |
|---|---|---|
| Invention sample 1 | 1,600 | 120 |
| Invention sample 2 | 1,600 | 120 |
| Invention sample 3 | 1,600 | 120 |
| Invention sample 4 | 1,600 | 120 |
| Invention sample 5 | 1,500 | 140 |
| Invention sample 6 | 1,600 | 140 |
| Invention sample 7 | 1,600 | 140 |
| Invention sample 8 | 1,600 | 150 |
| Invention sample 9 | 1,600 | 150 |
| Invention sample 10 | 1,500 | 150 |
| Invention sample 11 | 1,800 | 100 |
| Invention sample 12 | 1,800 | 100 |
| Comparative sample 1 | 1,800 | 120 |
| Comparative sample 2 | 1,600 | 120 |
| Comparative sample 3 | 1,800 | 120 |
| Comparative sample 4 | 1,600 | 100 |
| Comparative sample 5 | 1,400 | 120 |
| Comparative sample 6 | 1,600 | 150 |

The obtained ceramic sintered body was cut, and the cross-sectional surface which had appeared was mirror-polished using diamond paste. The obtained polished surface was observed via a 10,000-fold backscattered electron image using an SEM. Using an EDS included with the SEM, it was determined, concerning the polished surface, that: a black region referred to aluminum oxide; a gray region referred to zirconium oxide; and a white region referred to tungsten carbide, and a structural photograph was taken of the polished surface. With regard to the taken structural photograph of the polished surface, the content (volume %) of the aluminum oxide, the content (volume %) of the tungsten carbide and the content (volume %) of the zirconium oxide were measured based on the total content of the ceramic sintered body, using commercially available image analysis software. The results are shown in Table 3.

TABLE 3

| | Ceramic sintered body | | |
|---|---|---|---|
| Sample No. | Aluminum oxide (volume %) | Tungsten carbide (volume %) | Zirconium oxide (volume %) |
| Invention sample 1 | 30 | 60 | 10 |
| Invention sample 2 | 46 | 34 | 20 |
| Invention sample 3 | 72 | 27 | 1 |
| Invention sample 4 | 32 | 65 | 3 |
| Invention sample 5 | 43 | 45 | 12 |
| Invention sample 6 | 46 | 45 | 9 |
| Invention sample 7 | 48 | 41 | 11 |
| Invention sample 8 | 61 | 30 | 9 |
| Invention sample 9 | 55 | 31 | 14 |
| Invention sample 10 | 57 | 40 | 3 |
| Invention sample 11 | 50 | 43 | 7 |
| Invention sample 12 | 38 | 45 | 17 |
| Comparative sample 1 | 85 | 0 | 15 |
| Comparative sample 2 | 60 | 40 | 0 |
| Comparative sample 3 | 46 | 45 | 9 |
| Comparative sample 4 | 34 | 61 | 5 |
| Comparative sample 5 | 55 | 43 | 2 |
| Comparative sample 6 | 0 | 95 | 5 |

As to the obtained ceramic sintered bodies, in order to measure peak intensities of diffraction lines in an X-ray direction, with an X-ray diffractometer (product name "RINT TTR III") manufactured by Rigaku Corporation, an X-ray diffraction measurement by means of a 2θ/θ focusing optical system with Cu-Kα radiation was performed under the following conditions: an output: 50 kV, 250 mA; an incident-side solar slit: 5°; a divergence longitudinal slit: ⅔°; a divergence longitudinal limit slit: 5 mm; a scattering slit: ⅔°; a light-receiving side solar slit: 5°; a light-receiving slit: 0.3 mm; a BENT monochromater; a light-receiving monochrome slit: 0.8 mm; a sampling width: 0.01°; a scan speed: 2°/min; and a 2θ measurement range: 20°-80°. From the obtained X-ray diffraction pattern, an X-ray direction peak intensity $I_1$ for a (111) plane of ZrO, an X-ray direction peak intensity $I_{2t}$ for a (101) plane of tetragonal ZrO$_2$, an X-ray direction peak intensity $I_{2c}$ for a (111) plane of cubic ZrO$_2$, and an X-ray direction peak intensity $I_3$ for a (110) plane of α-type aluminum oxide were measured. By way of example, FIG. 1 shows a diffraction pattern of the results of the X-ray diffraction measurement concerning invention sample 7. It should be noted that, in FIG. 1, a tetragonal ZrO$_2$ (101) plane is denoted by t-ZrO$_2$ (101) and a cubic ZrO$_2$ (111) plane is denoted by c-ZrO$_2$ (111). Then, a ratio of $I_1$ based on a total of $I_1$, $I_{2t}$ and $I_{2c}$ [$I_1/(I_1+I_{2t}+I_{2c})$] and a ratio of a total of $I_{2t}$ and $I_{2c}$ based on $I_3$ [$(I_{2t}+I_{2c})/I_3$] were obtained. The values are shown in Table 4.

TABLE 4

| Sample No. | $I_1/(I_1 + I_{2t} + I_{2c})$ | $(I_{2t} + I_{2c})/I_3$ |
|---|---|---|
| Invention sample 1 | 0.40 | 2.10 |
| Invention sample 2 | 0.18 | 3.55 |
| Invention sample 3 | 0.52 | 0.15 |
| Invention sample 4 | 0.36 | 0.32 |
| Invention sample 5 | 0.05 | 1.98 |
| Invention sample 6 | 0.42 | 1.32 |
| Invention sample 7 | 0.83 | 0.29 |
| Invention sample 8 | 0.48 | 1.30 |
| Invention sample 9 | 0.11 | 3.98 |
| Invention sample 10 | 0.08 | 0.45 |

TABLE 4-continued

| Sample No. | $I_1/(I_1 + I_{2t} + I_{2c})$ | $(I_{2t} + I_{2c})/I_3$ |
|---|---|---|
| Invention sample 11 | 0.40 | 0.52 |
| Invention sample 12 | 0.34 | 3.34 |
| Comparative sample 1 | 0.22 | 0.66 |
| Comparative sample 2 | — | — |
| Comparative sample 3 | 0.00 | 2.14 |
| Comparative sample 4 | 0.00 | 1.50 |
| Comparative sample 5 | 1.00 | 0.23 |
| Comparative sample 6 | 0.00 | — |

* The symbol " " in the table indicates that no calculation could be performed because the sample did not contain aluminum oxide or contained neither tetragonal $ZrO_2$ nor cubic $ZrO_2$.

The average particle size of the tungsten carbide in the obtained ceramic sintered body was obtained from a structural photograph of a cross-sectional surface of the ceramic sintered body which has been taken by the SEM, using commercially available image analysis software. More specifically, firstly, the ceramic sintered body was cut, and the cross-sectional surface which had appeared was mirror-polished using diamond paste. The obtained polished surface was observed via a 10,000-fold secondary electron image using the SEM. Using an EDS included with the SEM, it was determined that: a black region referred to aluminum oxide; a gray region referred to zirconium oxide; and a white region referred to tungsten carbide. SEM structural images of the ceramic sintered body were taken for at least ten fields of view. Next, as to the obtained SEM images (structural photographs), using commercially available image analysis software, the particle size values obtained in accordance with ASTM E 112-96 were defined as particle sizes of the tungsten carbide located in the structure of the sintered body. The arithmetic mean of the resultant particle size values was defined as an average thickness of the tungsten carbide. The results are shown in Table 5.

TABLE 5

| Sample No. | Average particle size of tungsten carbide (μm) |
|---|---|
| Invention sample 1 | 0.68 |
| Invention sample 2 | 0.50 |
| Invention sample 3 | 0.52 |
| Invention sample 4 | 0.25 |
| Invention sample 5 | 1.52 |
| Invention sample 6 | 1.48 |
| Invention sample 7 | 1.36 |
| Invention sample 8 | 1.04 |
| Invention sample 9 | 0.98 |
| Invention sample 10 | 0.30 |
| Invention sample 11 | 0.34 |
| Invention sample 12 | 1.10 |
| Comparative sample 1 | 1.24 |
| Comparative sample 2 | 0.82 |
| Comparative sample 3 | 0.75 |
| Comparative sample 4 | 0.66 |
| Comparative sample 5 | 0.50 |
| Comparative sample 6 | 1.24 |

After mirror-polishing the surface of the obtained ceramic sintered body or any cross-sectional surface thereof with diamond paste, the resulting sintered body was received in a vacuum sintering furnace and was then subjected to thermal etching. The thermal etching was performed under the conditions of: a pressure of $5.3 \times 10^{-3}$ Pa; a temperature of 1,200° C.; and a holding time of 50 minutes. A 10,000-fold secondary electron image of the polished surface of the thermally-etched ceramic sintered body was observed using the SEM. SEM images (structural photographs) of the structure of the ceramic sintered body were taken for at least ten fields of view. Thereafter, as to the obtained SEM images (structural photographs), using commercially available image analysis software, the values obtained in accordance with ASTM E 112-96 were used to define an average particle size of the aluminum oxide located in the structure of the sintered body. The results are shown in Table 6.

TABLE 6

| Sample No. | Average particle size of aluminum oxide (μm) |
|---|---|
| Invention sample 1 | 0.78 |
| Invention sample 2 | 0.80 |
| Invention sample 3 | 0.76 |
| Invention sample 4 | 0.84 |
| Invention sample 5 | 0.64 |
| Invention sample 6 | 0.65 |
| Invention sample 7 | 0.62 |
| Invention sample 8 | 0.48 |
| Invention sample 9 | 0.45 |
| Invention sample 10 | 0.23 |
| Invention sample 11 | 1.98 |
| Invention sample 12 | 1.08 |
| Comparative sample 1 | 1.05 |
| Comparative sample 2 | 0.74 |
| Comparative sample 3 | 1.02 |
| Comparative sample 4 | 0.82 |
| Comparative sample 5 | 0.65 |
| Comparative sample 6 | Not containing aluminum oxide |

The invention samples and comparative samples were processed into cutting tools each having an ISO certified RPGX120700 insert shape. The following cutting tests were conducted on the obtained cutting tools. The results are shown in Table 7.

[Cutting Test 1: Wear Resistance Test]

Cutting method: Outer-periphery continuous cutting

Workpiece: Inconel 718 (registered trademark)

Workpiece shape: Cylinder of φ130 mm×370 mm

Cutting speed: 280 m/min

Depth of cut: 1.2 mm

Feed: 0.25 mm/rev

Coolant: Wet type

Evaluation items: A time when a sample was fractured or had a maximum flank wear width of 0.3 mm was defined as the end of the tool life, and the machining (cutting) time to reach the end of the tool life was measured.

[Cutting Test 2: Fracture Resistance Test]

Cutting method: End-surface continuous cutting

Workpiece: Inconel 718 (registered trademark)

Workpiece shape: Cylinder of φ300 mm×200 mm

Cutting speed: 250 m/min

Depth of cut: 2.0 mm

Feed: 0.20 mm/rev

Coolant: Wet type

Evaluation items: A time when a sample was fractured was defined as the end of the tool life, and the machining (cutting) time to reach the end of the tool life was measured.

TABLE 7

| Sample No. | Cutting test | | |
|---|---|---|---|
| | Wear resistance test | | Fracture resistance test |
| | Machining time (min) | Damage form | Machining time (min) |
| Invention sample 1 | 6.5 | Normal wear | 5.5 |
| Invention sample 2 | 5.2 | Normal wear | 6.2 |
| Invention sample 3 | 5.2 | Normal wear | 5.4 |
| Invention sample 4 | 6.8 | Normal wear | 5.5 |
| Invention sample 5 | 5.0 | Normal wear | 6.2 |
| Invention sample 6 | 6.8 | Normal wear | 6.4 |
| Invention sample 7 | 7.4 | Normal wear | 5.8 |
| Invention sample 8 | 6.0 | Normal wear | 8.4 |
| Invention sample 9 | 5.4 | Normal wear | 8.0 |
| Invention sample 10 | 5.8 | Normal wear | 7.2 |
| Invention sample 11 | 6.8 | Normal wear | 6.8 |
| Invention sample 12 | 6.6 | Normal wear | 6.4 |
| Comparative sample 1 | 2.0 | Normal wear | 4.2 |
| Comparative sample 2 | 1.2 | Fracturing | 0.2 |
| Comparative sample 3 | 3.8 | Normal wear | 6.0 |
| Comparative sample 4 | 4.2 | Normal wear | 5.4 |
| Comparative sample 5 | 5.6 | Fracturing | 4.4 |
| Comparative sample 6 | 0.5 | Fracturing | 0.5 |

As to the ceramic sintered body of each invention sample, the tool life was 5 minutes or more in both the wear resistance test and the fracture resistance test. Meanwhile, as to the ceramic sintered body of each comparative sample, the tool life was less than 5 minutes in either the wear resistance test or the fracture resistance test. This indicates that, due to improved wear resistance without a reduction in fracture resistance, the tool life of the ceramic sintered body of each invention sample is longer than the tool life of the ceramic sintered body of each comparative sample.

The present application is based on the Japanese patent application filed on Dec. 7, 2015 (JP Appl. 2015-238155), the content of which is incorporated herein by reference.

INDUSTRIAL APPLICABILITY

A ceramic sintered body according to the present invention has excellent wear resistance without a reduction in fracture resistance and allows for the extension of tool life when it is used, in particular, for cutting tools and wear resistant tools and therefore has high industrial applicability.

What is claimed is:

1. A ceramic sintered body containing aluminum oxide, tungsten carbide and zirconium oxide, wherein:
the zirconium oxide contains ZrO and $ZrO_2$;
the $ZrO_2$ has a crystal structure or structures of one or two kinds selected from the group consisting of a tetragonal crystal structure and a cubic crystal structure;
based on a total content of the ceramic sintered body:
a content of the aluminum oxide is from 30 volume % or more to 74 volume % or less;
a content of the tungsten carbide is from 25 volume % or more to 69 volume % or less; and
a content of the zirconium oxide is from 1 volume % or more to 20 volume % or less; and
when, in X-ray diffraction, regarding a peak intensity for a (111) plane of the ZrO as being denoted by $I_1$, regarding a peak intensity for a (101) plane of $ZrO_2$ having a tetragonal crystal structure as being denoted by $I_{2t}$, and also regarding a peak intensity for a (111) plane of $ZrO_2$ having a cubic crystal structure as being denoted by $I_{2c}$, a ratio of $I_1$ based on a total of $I_1$, $I_{2t}$ and $I_{2c}$ [$I_1/(I_1+I_{2t}+I_{2c})$] is from 0.05 or more to 0.90 or less.

2. The ceramic sintered body according to claim 1, wherein the ratio of $I_1$ based on a total of $I_1$, $I_{2t}$ and $I_{2c}$ [$I_1/(I_1+I_{2t}+I_{2c})$] is from 0.20 or more to 0.80 or less.

3. The ceramic sintered body according to claim 1, wherein:
the aluminum oxide is α-type aluminum oxide; and
when, in X-ray diffraction, regarding a peak intensity for a (110) plane of the α-type aluminum oxide as being denoted by $I_3$, a ratio of a total of $I_{2t}$ and $I_{2c}$ based on $I_3$ [$(I_{2t}+I_{2c})/I_3$] is from 0.30 or more to 4.00 or less.

4. The ceramic sintered body according to claim 1, wherein an average particle size of the aluminum oxide is from 0.20 μm or more to 2.00 μm or less.

5. The ceramic sintered body according to claim 1, wherein an average particle size of the tungsten carbide is from 0.10 μm or more to 1.50 μm or less.

6. The ceramic sintered body according to claim 2, wherein:
the aluminum oxide is α-type aluminum oxide; and
when, in X-ray diffraction, regarding a peak intensity for a (110) plane of the α-type aluminum oxide as being denoted by $I_3$, a ratio of a total of $I_{2t}$ and $I_{2c}$ based on $I_3$ [$(I_{2t}+I_{2c})/I_3$] is from 0.30 or more to 4.00 or less.

7. The ceramic sintered body according to claim 6, wherein an average particle size of the aluminum oxide is from 0.20 μm or more to 2.00 μm or less.

8. The ceramic sintered body according to claim 2, wherein an average particle size of the aluminum oxide is from 0.20 μm or more to 2.00 μm or less.

9. The ceramic sintered body according to claim 3, wherein an average particle size of the aluminum oxide is from 0.20 μm or more to 2.00 μm or less.

10. The ceramic sintered body according to claim 2, wherein an average particle size of the tungsten carbide is from 0.10 μm or more to 1.50 μm or less.

11. The ceramic sintered body according to claim 3, wherein an average particle size of the tungsten carbide is from 0.10 μm or more to 1.50 μm or less.

12. The ceramic sintered body according to claim 4, wherein an average particle size of the tungsten carbide is from 0.10 μm or more to 1.50 μm or less.

* * * * *